United States Patent
Shi

[11] Patent Number: 6,131,033
[45] Date of Patent: Oct. 10, 2000

[54] METHODS AND SYSTEMS OF PERFORMING SYSTEM CHANNEL PLANNING FOR WIRELESS LOCAL LOOP COMMUNICATION

[75] Inventor: Hong Shi, Cary, N.C.

[73] Assignee: Ericsson, Inc., Research Triangle Park, N.C.

[21] Appl. No.: 09/074,203

[22] Filed: May 7, 1998

Related U.S. Application Data

[60] Provisional application No. 60/066,763, Nov. 19, 1997.

[51] Int. Cl.[7] .............................. H04Q 7/20; H04Q 7/30
[52] U.S. Cl. ....................... 455/446; 455/447; 455/448; 455/449; 455/561; 455/3.1; 370/337; 370/335
[58] Field of Search .......................... 455/3.1, 446, 561, 455/562, 554, 555, 447, 448, 449, 400; 370/337, 335, 321

[56] References Cited

U.S. PATENT DOCUMENTS

| | | | |
|---|---|---|---|
| 5,307,372 | 4/1994 | Sawyer et al. ............................. | 375/1 |
| 5,533,027 | 7/1996 | Ackerberg et al. ................... | 370/195.1 |
| 5,581,548 | 12/1996 | Ugland et al. ........................... | 370/330 |
| 5,604,789 | 2/1997 | Lerman ..................................... | 455/20 |
| 5,848,095 | 12/1998 | Deutsch ................................... | 375/202 |
| 5,999,818 | 12/1999 | Gilbert et al. ........................... | 455/448 |

*Primary Examiner*—Daniel S. Hunter
*Assistant Examiner*—Alan Gantt
*Attorney, Agent, or Firm*—Wood, Phillips, VanSanten, Clark & Mortimer

[57] ABSTRACT

Methods and systems of communication reduce the internal interference associated with conducting radio communication in a wireless local loop communication system down to acceptable levels. Problems associated with internal interference are solved by providing carrier frequency rotation during time slots in a frame. A plurality of radio fixed parts are utilized for conducting radio communication with user terminals. During operation, each of a plurality of sequentially related carrier frequencies is assigned in sequential order to a respective one of the plurality of radio fixed parts. Each of the plurality of carrier frequencies is advanced during each successive time slot during operation of the wireless system. In addition, the control system controls operation of the radio fixed parts by allowing and disallowing transmission and reception in certain predetermined time slots.

20 Claims, 3 Drawing Sheets

G = GUARD SPACE, 32 BITS
S = SYNCHRONIZATION FIELDS, 56 BITS
A = SIGNALING FIELD, 64 BITS
B = DATA FIELD, 320 BITS
X = CRC CHECK FIELD, 4 BITS
Z = SLIDING INTERFERENCE DETECTION FIELD, 4 BITS

Fig. 4

RADIO ACCESS NODE

| | RFP 1 (24) | RFP 2 (26) | RFP 3 (28) | RFP 4 (30) | RFP 5 (32) | RFP 6 (34) |
|---|---|---|---|---|---|---|
| TS1 | 401 | 402 | 403 | 404 | 405 | 403 |
| TS2 | 402 | 403 | 404 | 405 | 401 | 404 |
| TS3 | 403 | 404 | 405 | 401 | 402 | 405 |
| TS4 | 404 | 405 | 401 | 402 | 403 | 401 |
| TS5 | 405 | 401 | 402 | 403 | 404 | 402 |
| TS6 | 401 | 403 | 403 | 404 | 405 | 403 |

TIME SLOT (TS)

Fig. 5

RADIO ACCESS NODE

| | RFP 1 | RFP 2 | RFP 3 | RFP 4 | RFP 5 | RFP 6 | RFP 7 | RFP 8 | RFP 9 | RFP 10 | RFP 11 | RFP 12 |
|---|---|---|---|---|---|---|---|---|---|---|---|---|
| TS1 | 401 | 402 | 403 | 404 | 405 | 401 | 402 | 403 | 404 | 405 | 403 | 404 |
| TS2 | 402 | 403 | 404 | 405 | 401 | 402 | 403 | 404 | 405 | 401 | 404 | 405 |
| TS3 | 403 | 404 | 405 | 401 | 402 | 403 | 404 | 405 | 401 | 402 | 405 | 401 |
| TS4 | 404 | 405 | 401 | 402 | 403 | 404 | 405 | 401 | 402 | 403 | 401 | 402 |
| TS5 | 405 | 401 | 402 | 403 | 404 | 405 | 401 | 402 | 403 | 404 | 402 | 403 |
| TS6 | 401 | 402 | 403 | 404 | 405 | 401 | 402 | 403 | 404 | 405 | 403 | 404 |
| TS7 | 402 | 403 | 404 | 405 | 401 | 402 | 403 | 404 | 405 | 401 | 404 | 405 |
| TS8 | 403 | 404 | 405 | 401 | 402 | 403 | 404 | 405 | 401 | 402 | 405 | 401 |
| TS9 | 404 | 405 | 401 | 402 | 403 | 404 | 405 | 401 | 402 | 403 | 401 | 402 |
| TS10 | 405 | 401 | 402 | 403 | 404 | 405 | 401 | 402 | 403 | 404 | 402 | 403 |
| TS11 | 401 | 402 | 403 | 404 | 405 | 401 | 402 | 403 | 404 | 405 | 403 | 404 |
| TS12 | 402 | 403 | 404 | 405 | 401 | 402 | 403 | 404 | 405 | 401 | 404 | 405 |

TIME SLOT (TS)

METHODS AND SYSTEMS OF PERFORMING SYSTEM CHANNEL PLANNING FOR WIRELESS LOCAL LOOP COMMUNICATION

This application claims the benefit under 35 U.S.C. §119(e) of Provisional U.S. patent application Ser. No. 60/066,763, filed on Nov. 19, 1997.

FIELD OF THE INVENTION

The present invention relates to a novel method of communication for wireless local loop communication systems and, more particularly, to methods and systems for carrier frequency rotation during radio transmission and reception between a radio access node and a user terminal to minimize internal interference and blocking problems.

BACKGROUND OF THE INVENTION

Cellular systems operate on the principle of frequency reuse which gives a cellular operator the ability to offer high radio traffic capacity. With higher radio traffic capacities, more users per geographic area are able to utilize radio communication. Frequency reuse, which is a core concept in cellular communication, involves reusing the same frequency in a system many times over to handle multiple calls. Time-division multiple access ("TDMA") is a form of access technology that allows multiple users to occupy the same frequency spectrum. Each user of the cellular system shares the frequency allocation with other users who have time slot allocation during other periods.

In a wireless local loop communication system using the TDMA standard of cellular communication, many users share the same frequency channel, each user being allocated a unique time slot. As traffic increases within each random access node, or cell site, the level of internal interference and signal blocking rises because the number of frequency carriers being used in neighboring, radio fixed parts increases. When a fixed access unit, or a mobile station, is engaged in a call, the user will experience quality problems as various factors affect the quality of radio communication, such as internal interference, blocking, load, multipath propagation, scattering and reflection. Prior attempts have been made to reduce such problems associated with the quality of calls.

Prior low-tier PCS communication systems have attempted to solve the problem of internal system interference and blocking by using dynamic channel allocation. In order to maintain the quality of radio communication within the cellular network, a fixed access unit, or mobile unit, will scan the operating environment and select all available channels. The scan result is then loaded in a history table in the order of its quality. The history table is updated at different time intervals to constantly monitor the condition of the various channels available for use. If a handset or mobile unit starts experiencing interference, fading, or receiving a stronger signal from another base station during the call, the mobile unit will automatically switch to a better channel based on the information loaded in the history table.

In a wireless local loop communication system, the distance between a random access node and a fixed access unit is much larger than the operating range of a business wireless system. A radio access node and a fixed access unit can be up to 3000 meters apart whereas in a business wireless system, the radio access node and fixed access units are usually up to 300 meters apart. The local channel condition can be quite different for a fixed access unit in these two systems because of the interference and blocking problems experienced by the radio fixed part. A channel sensed by the fixed access unit as a good channel might be a bad channel for a radio fixed part. A dynamic channel allocation system cannot tell the difference in channel quality and, hence, it will not effectively solve the problems associated with internal interference and blocking. As a result of this problem, the capacity of the cellular system is dramatically deteriorated as traffic rises. Therefore, a need exists for a method of system channel planning that will effectively solve the problems associated with internal interference and blocking in a wireless local loop communication system.

SUMMARY OF THE INVENTION

The present invention solves the problems associated with internal interference and blocking by providing a method of frequency carrier planning for wireless local loop communication systems. The invention comprises a method of communication for wireless local loop communication systems. In the invention, a plurality of indexed radio fixed parts is used to make up an array, known as a radio access node. In addition, a plurality of sequentially related carrier frequencies are provided for conducting radio communication. Each of the plurality of carrier frequencies are divided into a series of frames, the frames are comprised of a plurality of time slots. In operation, each of the sequentially related carrier frequencies is assigned in sequential order to a respective one of the indexed radio fixed parts in each of the time slots. Each of the plurality of sequentially related carrier frequencies is advanced each successive time slot by a predetermined number of carrier frequencies. The last carrier frequency of the plurality of sequentially related carrier frequencies being followed by the first carrier frequency.

In order to further reduce internal interference, during operation, each of the plurality of sequentially related carrier frequencies is assigned so that no adjacent radio fixed part in the array is utilizing the same carrier frequency in a given time slot. The method may further comprise the step of dividing each of the frames into a first time slot set and a second time slot set. The wireless local loop communication may then disallow radio reception in the odd-numbered indexed radio fixed parts and may simultaneously disallow radio transmission in the even-numbered indexed radio fixed parts during the first time slot set. Likewise, the wireless local loop communication system can disallow radio transmission in the even-numbered indexed radio fixed parts and disallow radio reception in the even-numbered indexed radio fixed parts during the second time slot set.

The present invention also discloses a wireless local loop communication system. The wireless local loop communication system has a plurality of indexed radio fixed parts that use a plurality of sequentially related carrier frequencies for conducting radio communication with user terminals. Each of the sequentially related carrier frequencies are divided into a series of frames, which are made up of a plurality of time slots. A control unit is connected with the plurality of indexed radio fixed parts for assigning each of the sequentially related carrier frequencies to a respective one of the plurality of indexed radio fixed parts in sequential order in each of the time slots.

During operation, the control unit indexes each of the sequentially related carrier frequencies during each successive time slot by advancing the plurality of sequentially related carrier frequencies a predetermined number of carrier frequencies at each of the indexed radio fixed parts. The last carrier frequency of the series of sequentially related carrier frequencies being replaced by the first carrier frequency. In the preferred embodiment, the carrier frequencies are indexed by one carrier frequency. In addition, to further minimize internal interference, the sequentially related carrier frequencies are assigned so that no adjacent indexed radio fixed part is assigned the same carrier frequency when the number of indexed radio fixed parts exceeds the number of sequentially related carrier frequencies.

The wireless communication system may also divide the frames into a first time slot set and a second time slot set. The control unit then disallows radio reception in the odd-numbered indexed radio fixed parts and can also disallow radio transmission in the even-numbered indexed radio fixed parts during the first time slot set. In addition, the control unit may disallow radio transmission in the odd-numbered indexed radio fixed parts and may disallow radio reception in the even-numbered indexed radio fixed parts during the second time slot set.

Other features and advantages of the invention will be apparent from the drawings and the more detailed description of the invention that follows.

BRIEF DESCRIPTION OF THE DRAWINGS

FIG. 4 illustrates the carrier frequency assignment for a RAN having six radio fixed parts.

FIG. 5 illustrates the carrier frequency assignment for a RAN having twelve radio fixed parts.

DETAILED DESCRIPTION OF THE INVENTION

The present invention comprises a novel method of system carrier frequency planning in a wireless local loop communication system that will maintain internal radio interference and blocking at acceptable levels. This method provides greater quality, flexibility and capacity in wireless local loop networks thereby addressing the problems associated with the prior art. Since the present invention comprises methods and systems for optimally operating multi-channel wireless local loop communication systems, it is important to have a basic understanding of how such wireless local loop communication systems operate.

A wireless local loop communication system can vary from location to location, depending on the needs of the system. For instance, a wireless local loop communication system utilized in a rural setting is different from those utilized in a densely populated urban area. The present invention provides a method of system operation for wireless local loop communication systems that allows multiple users to access the system while maintaining internal interference and blocking levels low enough to not affect radio communication. A person of ordinary skill in the art of radio communications will recognize that the disclosed method can be adapted to other wireless networks thereby increasing the quality of those systems as well.

Figure 1:
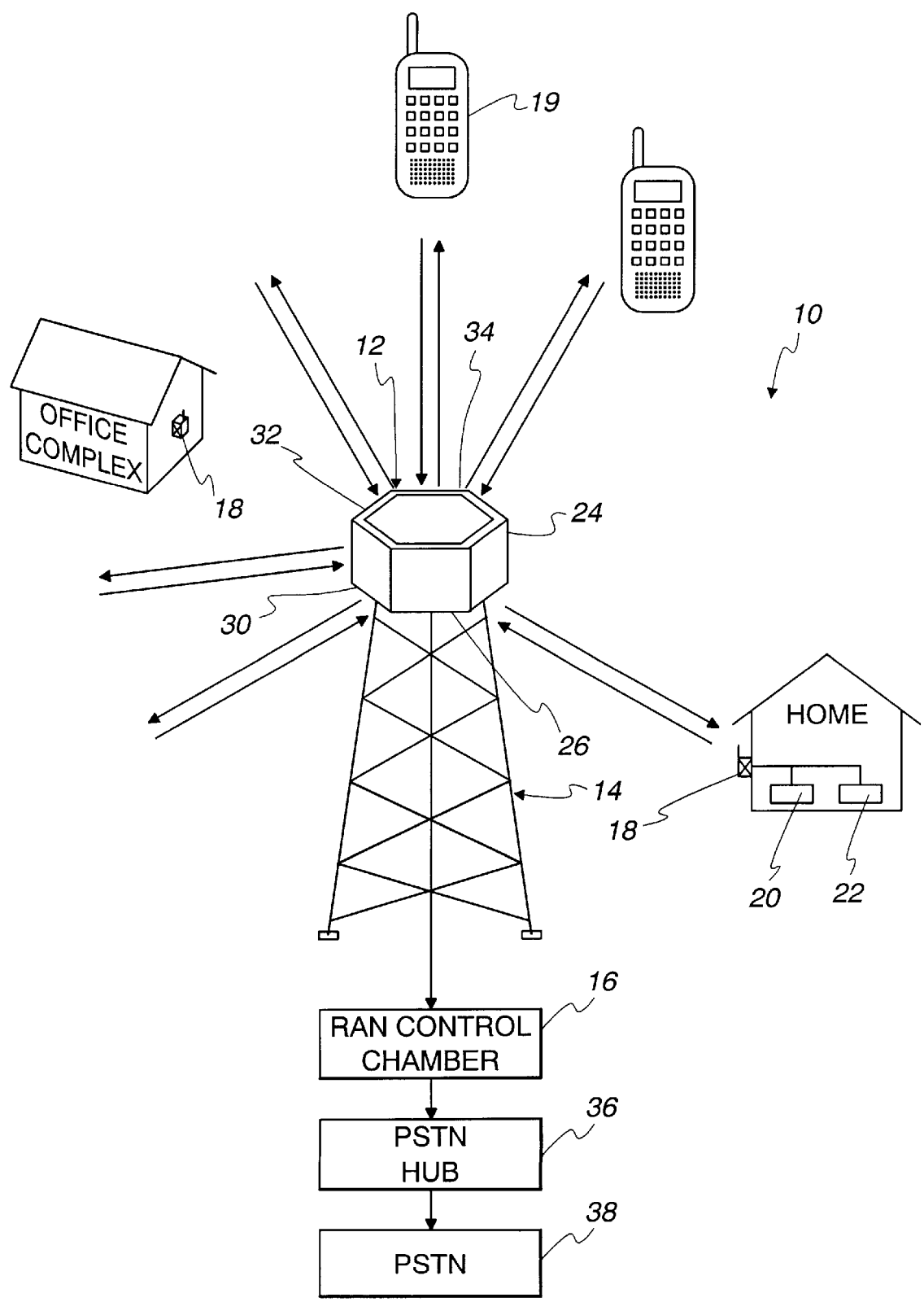
FIG. 1 is a diagrammatic representation of a preferred embodiment of a wireless local loop communication system.

In FIG. 1, a wireless local loop communication system 10 is illustrated that can be used to conduct radio communication with a plurality of user terminals. As illustrated, a radio access node ("RAN") 12, which may be positioned on a tower 14 above the ground, is connected with a RAN control chamber 16. The RAN 12 is responsible for transmitting and receiving radio signals from any communication device that may be connected with the wireless local loop communication system 10, utilizing one of several standardized communication protocols. In a wireless local loop communication system 10, radio communication is conducted between the RAN 12 and a plurality of fixed access units 18 that may be connected with a home or business. The plurality of fixed access units 18 may be connected with a variety of communication devices, including but not limited to a telephone 20, a modem 22, a fax machine or any other communication device that is capable of conducting radio communication. Portable phones 19 can also conduct radio communication with the RAN 12 and reference to fixed access units 18 should be viewed as encompassing cellular phones 19 and all other types of communication devices that are adapted for radio communication.

Figure 1A:
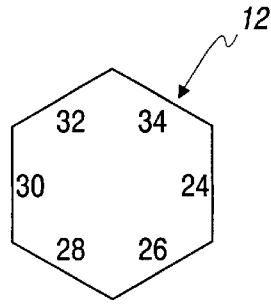
FIG. 1A is a diagrammatic representation of a radio access node having six radio fixed parts.
Figure 1B:
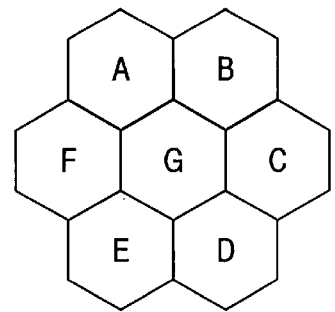
FIG. 1B is a diagrammatic representation of an array of radio access nodes.

A typical RAN 12 comprises a plurality of radio fixed parts 24, 26, 28, 30, 32 and 34 that are arranged in an array and are responsible for transmitting and receiving radio signals used by the various communication devices connected with the wireless local loop communication system 10. (See FIG. 1A.) The plurality of radio fixed parts 24, 26, 28, 30, 32 and 34 are arranged in a geometric array so that they cover 360 degrees of rotation in a horizontal plane. As illustrated in FIG. 1A, an array of six radio fixed parts 24, 26, 28, 30, 32 and 34 have been utilized to create the RAN 12. An array of radio fixed parts can be made from 6, 12, 18 or more radio fixed parts and the disclosure of six is by way of example only and is by no means meant as a limitation. As depicted in FIG. 1B, a plurality of RANs 12 are typically grouped together to create a wider coverage area.

In order to allow users of the wireless local loop communication system 10 to communicate with the public, the RAN control unit 16 is connected with a public switched telephone network hub 36. The public switched telephone network hub 36 is connected with the public switched telephone network (PSTN) 38 and allows users of the wireless local loop communication system 10 to communicate with anyone connected with the public telephone networks. The RAN control unit 16 is usually located near the RAN 12 and is responsible for controlling the transmission and reception of radio signals between the RAN 12 and the plurality of fixed access units 18. The RAN control unit 16 is also responsible for controlling communication between a user on the wireless local loop communication system 10 and the public switched telephone network 38.

In order to conduct radio communication between the plurality of radio fixed parts 24, 26, 28, 30, 32 and 34 and the plurality of fixed access units 18, a standard digital communication protocol must be chosen. In preferred embodiments of the present invention, the method of communication will operate using time-division multiple access ("TDMA") as the standard communication protocol. TDMA is a well-known access technology that allows multiple users to occupy the same carrier frequency through the use of time division. The standard TDMA format utilized by the United States is the IS-54 standard and is referred to as the North American dual mode cellular format. In the United States, the Federal Communications Commission has allocated a block of radio frequency from 1850–1990 MHz known as the PCS band. The upper frequency band ranges from 1930–1990 MHz and the lower frequency band ranges from 1850–1910 MHz for digital cellular communication. The European standard for digital cordless telephony using the TDMA format is commonly referred to as the Digital European Cordless Telecommunications ("DECT") standard.

Figure 2:
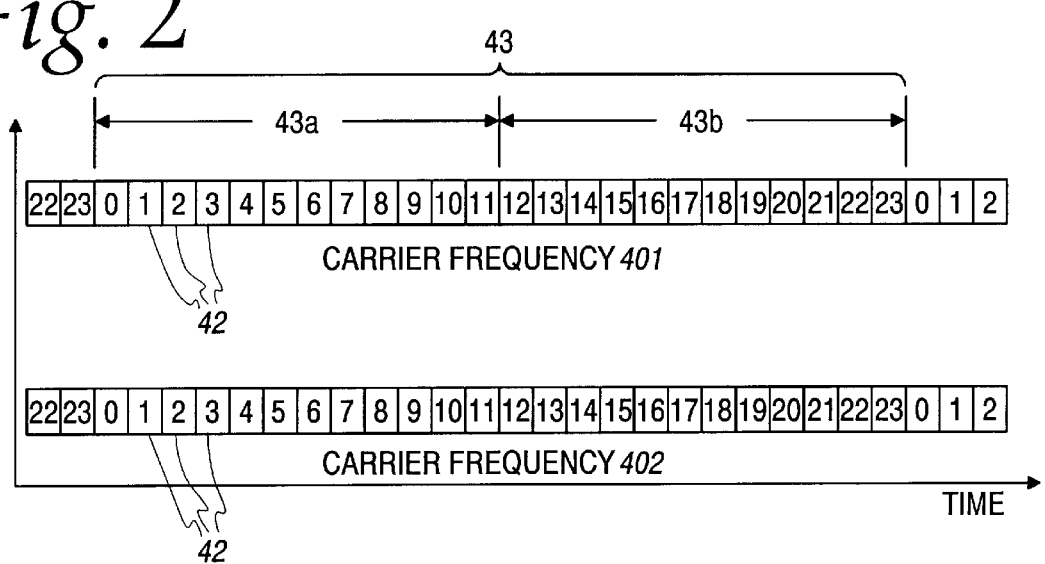
FIG. 2 is a diagrammatic breakdown of a series of time slots which is used in TDMA radio communication.
Figure 3:
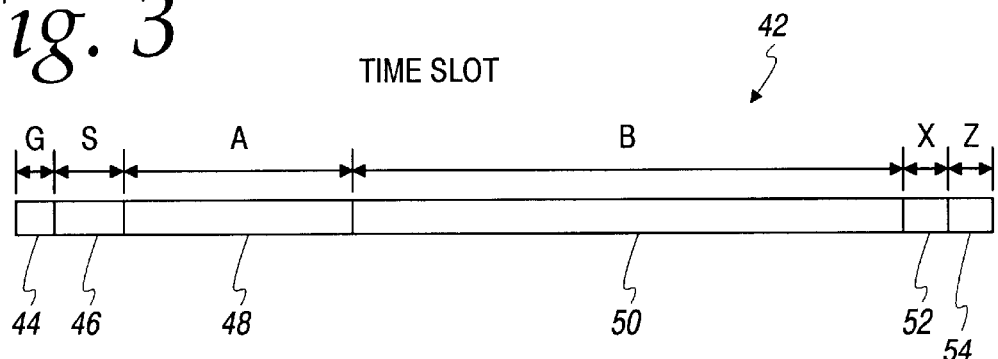
FIG. 3 is a diagrammatic illustration of a time slot.

The communication method of the present invention advantageously utilizes the TDMA communication protocol. As illustrated in FIG. 2, the TDMA protocol divides a plurality of frequency carriers 401, 402 into a predefined repeated sequence of small time slots 42. FIG. 3 illustrates a typical time slot 42. Each time slot 42 gives a communication device the ability to send or receive a certain quantity of data bits, 480 in commonly utilized formats, on a carrier frequency 40 per time slot 42. Since a conversation including a transmission and a reception can use only two time slots 42, a single carrier frequency 40 is capable of conducting a number of calls simultaneously. As depicted in FIG. 3, the time slots 42 are routinely broken down into smaller time slots that can have small portions of data that may be used, for example, for a guard space 44, a synchronization field 46, a signaling field 48, a data field 50, a CRC check field 52 and a sliding interference detection field 54. The exact function of each of these smaller time segments is not important for an understanding of the method of system channel planning of this invention.

The invention uses a plurality of sequentially related frequency carriers, which in the descriptions are represented by the sequential numbers 401–405. The frequency carriers 401–405 may be selected from any portion of the frequency spectrum available for radio communication. Although only five frequency carriers 401–405 are discussed, one skilled in the art would recognize that the number of frequency carriers can vary.

Preferred embodiments of the present invention comprise a method of communication for wireless local loop communication systems 10. In the invention, an array 12 of a plurality of indexed radio fixed parts 24, 26, 28, 30, 32 and 34 is provided that is capable of conducting radio communication with the fixed access units 18. As previously stated, a fixed access unit 18 can either be a mobile unit 19 or fixed access unit 18. A plurality of sequentially related carrier frequencies, for example, depicted as 401, 402, 403, 404 in FIGS. 4 and 5 is provided for conducting radio communication between the plurality of indexed radio fixed parts 24, 26, 28, 30, 32 and 34 and the fixed access unit 18.

The present method provides a series of frames 43 that are divided into a plurality of time slots 42, as depicted in FIG. 2. The series of frames 43 are all synchronized on each of the plurality of sequentially related carrier frequencies 401–405. During operation, the present method assigns each of the plurality of sequentially related carrier frequencies 401–405 to a respective one of the plurality of indexed radio fixed parts 24, 26, 28, 30, 32 and 34 in sequential order in each of the indexed time slots 43, as shown in FIG. 4. In addition, during operation, the method indexes each of the sequentially related carrier frequencies 401–405 during each successive time slot 43 by advancing the plurality of sequentially related carrier frequencies 401–405 by one carrier frequency 401, e.g., from 401 to 402, in each of the plurality of indexed radio fixed parts 24, 26, 28, 30, 32 and 34 as shown in FIG. 4. Since the number of radio fixed parts 24, 26, 28, 30, 32 and 34 may exceed the number of sequentially related carrier frequencies 401–405, during operation, the last carrier frequency available, e.g. 405, is replaced by the first carrier frequency available, e.g., 401, in sequencing the carrier frequencies 401–405.

In the invention, the preferred method advantageously assigns the sequentially related carrier frequencies 401–405 so that no adjacent indexed radio fixed part 24, 26, 28, 30, 32 or 34 in the array 12 is assigned the same carrier frequency when the number of indexed radio fixed parts 24, 26, 28, 30, 32 and 34 exceeds the number of sequentially related carrier frequencies 401–405. For illustrative purposes only, assume, as shown in FIG. 4, that an array 12 comprises six radio fixed parts 24, 26, 28, 30, 32 and 34 and the wireless local loop communication system 10 only has five carrier frequencies 401–405 available and six time slots TS1–TS6 per frame 43. As such, during the first time slot TS1, the present invention assigns carrier frequency 401 to the first radio fixed part 24, carrier frequency 402 to the second radio fixed part 26, carrier frequency 403 to the third radio fixed part 28, carrier frequency 404 to the fourth radio fixed part 30, carrier frequency 405 to the fifth radio fixed part 32 and carrier frequency 403 to the sixth radio fixed part 34.

During operation, if the method continued to assign carrier frequencies 401–405 in a purely sequential manner after the fifth radio fixed part 32, then the sixth radio fixed part 34 would be assigned the first carrier frequency 401. As such, the sixth radio fixed part 34 and the adjacent first radio fixed part 24 (see FIG. 1A) would be utilizing the same carrier frequency 401. This would result in internal interference and would cause the wireless local loop communication system 10 to experience loss in the quality of radio communication. To avoid such a loss in communication quality, the invention assigns the third carrier frequency 403 in the sixth radio fixed part 34.

The preferred method of communication for wireless local loop communication systems 10 may further comprise the step of dividing the series of frames 43 into a first time slot set 43a and a second time slot set 43b. The preferred method can then comprise the steps of disallowing radio reception in the first set of radio fixed parts, (e.g., radio fixed parts 24, 28 and 32) during the first time slot set 43a; disallowing radio transmission in a second set of radio fixed parts (e.g., radio fixed parts 26, 30, 34) during the first time slot set 43a; disallowing radio transmission in the first set of radio fixed parts (e.g., radio fixed parts 26, 30 and 34) during the second time slot set 43b; and disallowing radio reception in the other radio fixed parts (e.g., radio fixed parts 26, 30 and 34) during the second time slot set 43b. The first set of radio fixed parts and the second set of radio fixed parts comprises radio fixed parts that are not adjacent. For example, none of radio fixed parts 24, 28 and 32 of this first set are adjacent. This control of transmission and reception times assures that no adjacent carrier frequency is either transmitting or receiving at the same time, thereby reducing internal system interference.

Another preferred embodiment of the present invention discloses a method of multi-channel planning for a wireless local loop communication system 10. The preferred embodiment of the present invention comprises the steps of providing a series of frames 43, said frames 43 comprising a plurality of time slots 42; providing a plurality of indexed radio fixed parts 24, 26, 28, 30, 32 and 34; providing a plurality of sequentially related carrier frequencies 401–405; assigning in sequential order each of the sequentially related carrier frequencies 401–405 to a respective one of the indexed radio fixed parts 24, 26, 28, 30, 32 or 34 in each of the time slots 42; advancing each of the plurality of sequentially related carrier frequencies 401–405 each successive time slot 42 by a predetermined number of carrier frequencies, the last carrier frequency 405 of the plurality of sequentially related carrier frequencies 401–405 being followed by the first carrier frequency 401; and assigning the plurality of sequentially related carrier frequencies so that no adjacent radio fixed part 24, 26, 28, 30, 32 or 34 in the array 12 is assigned the same carrier frequency.

The preferred method may further comprise the step of dividing each of the frames 43 into a first time slot set 43a and a second time slot set 43b. To further reduce the internal interference caused by operation of the wireless local loop communication system 10, the preferred method can disallow radio reception in a first set of radio fixed parts and disallow radio transmission in a second set of radio fixed parts during the first time slot set 43a. In addition, the preferred method can disallow radio transmission in the first set of radio fixed parts and disallow radio reception in the second set of radio fixed parts during the second time slot set 43b.

Another preferred embodiment of the present invention discloses a wireless local loop communication system 10 that is capable of conducting wireless communication while maintaining internal interference levels at acceptable ranges. The system comprises a plurality of indexed radio fixed parts 24, 26, 28, 30, 32 and 34 arranged in an array 12 that are used for conducting radio communication with a plurality of fixed access terminals 18. The system uses a plurality of sequentially related carrier frequencies 401–405 which are divided into a series of frames 43 that comprise a plurality of time slots 42. A control unit is connected with the plurality of indexed radio fixed parts 24, 26, 28, 30, 32 and 34 for assigning each of the sequential carrier frequencies 401–405 to a respective one of the plurality of indexed radio fixed parts 24, 26, 28, 30, 32 and 34 in sequential order in each of the time slots 42.

During operation, the control unit 16 indexes each of the sequentially related carrier frequencies 401–405 each successive time slot 42 by advancing the plurality of sequentially related carrier frequencies by a predetermined number of carrier frequencies at each of the indexed radio fixed parts 24, 26, 28, 30, 32 and 34. In sequencing the frequencies, the last carrier frequency 401–405 of the series of sequentially related carrier frequencies 401–405 is replaced by the first carrier frequency (e.g., 401) when the number of indexed radio fixed parts 24, 26, 28, 30, 32 and 34 exceeds the number of sequentially related carrier frequencies 401–405. In preferred embodiments of the present invention, the predetermined number of carrier frequencies by which the system advances is one carrier frequency, e.g. 401 to 402, 402 to 403, etc.

In preferred embodiments of the wireless local loop communication system 10, the control unit 16 assigns the sequentially related carrier frequencies 401–405 so that no adjacent indexed radio fixed part 24, 26, 28, 30, 32 or 34 is assigned the same carrier frequency when the number of indexed radio fixed parts 24, 26, 28, 30, 32 and 34 exceeds the number of sequentially related carrier frequencies 401–405. Referring to FIGS. 1A and 4, a preferred embodiment of an array 12 having six radio fixed parts 24, 26, 28, 30, 32 and 34 could be assigned five sequential carrier frequencies 401–405 to use during a frame 43 which has six time slots 42. As described, the number of radio fixed parts exceeds the number of available carrier frequencies.

When the carrier frequencies are assigned to each of the indexed radio fixed parts 24, 26, 28, 30, 32 and 34, they are assigned sequentially. As such, during operation, radio fixed part 24 would be assigned to the first carrier frequency 401, the second radio fixed part 26 would be assigned to the second carrier frequency 402, the third radio fixed part 28 would be assigned to the third carrier frequency 403, the fourth radio fixed part 30 would be assigned to the fourth carrier frequency 404, and the fifth radio fixed part 32 would be assigned to the fifth carrier frequency 405. Because the first radio fixed part 24 was assigned to the first carrier frequency 401, the sixth radio fixed part 34 cannot be assigned to the first carrier frequency 401. Using the same carrier frequency in adjacent radio fixed parts 24, 34 during a time slot 42 would cause internal interference with the radio communication being conducted. Therefore, as each of the plurality of radio fixed parts 24, 26, 28, 30, 32 and 34 progresses in carrier frequency assignment during each successive time slot 42, no adjacent radio fixed parts 24, 34 will utilize the same carrier frequency. FIG. 5 illustrates the channel assignment method that could be utilized in a RAN 12 having 12 radio fixed parts.

In another preferred embodiment of the present invention, the wireless local loop communication system 10 divides the frames 43 into a first time slot set 43a and a second time slot set 43b. In order to further reduce internal interference, the control unit 16 disallows radio reception in the odd-numbered indexed radio fixed parts and transmission in the even-numbered indexed radio fixed parts during the first time slot set 43a. Likewise, in the second time slot set 43b, the control unit 16 disallows radio transmission in the odd-numbered indexed radio fixed parts and disallows radio reception in the even-numbered indexed radio fixed parts.

Although several preferred embodiments of this invention have been disclosed, one skilled in the art would recognize that the disclosed methods can be utilized in numerous types of communication systems. It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the following claims, including all equivalents that are intended to define the spirit and scope of this invention.

What is claimed is:

1. A method of communication for wireless local loop communication systems comprising the steps of:

providing an array of a plurality of indexed radio fixed parts;

providing a plurality of sequentially related carrier frequencies;

providing a series of frames divided into a plurality of time slots with the plurality of sequentially related carrier frequencies;

assigning each of the plurality of sequentially related carrier frequencies to a respective one of the plurality of indexed radio fixed parts in sequential order in each of the indexed time slots; and indexing each of the sequentially related carrier frequencies during each successive time slot by advancing the plurality of sequentially related carrier frequencies by one carrier frequency at each of the plurality of indexed radio fixed parts, the last carrier frequency of the series of sequentially related carrier frequencies being followed by the first carrier frequency in the indexing at each of the plurality of indexed radio fixed parts.

2. The method of claim 1, further comprising the step of assigning the sequentially related carrier frequencies so that no adjacent indexed radio fixed part in the array is assigned the same carrier frequency when the number of indexed radio fixed parts exceeds the number of sequentially related carrier frequencies.

3. The method of claim 1, further comprising the step of dividing the series of frames into a first time slot set and a second time slot set.

4. The method of claim 3, further comprising the step of disallowing radio reception in a first set of indexed radio fixed parts during the first time slot set.

5. The method of claim 3, further comprising the step of disallowing radio transmission in a second set of indexed radio fixed parts during the first time slot set.

6. The method of claim 3, further comprising the step of disallowing radio transmission in a first set of indexed radio fixed parts during the second time slot set.

7. The method of claim 3, further comprising the step of disallowing radio reception in a second set of indexed radio fixed parts during the second time slot set.

8. A method of multi-channel planning for a wireless local loop communication system, comprising the steps of:

provided a series of frames, said frames comprising a plurality of time slots;

providing a plurality of indexed radio fixed parts;

providing a plurality of sequentially related carrier frequencies;

assigning in sequential order each of the sequentially related carrier frequencies to a respective one of the indexed radio fixed parts in each of the time slots;

advancing each of the plurality of sequentially related carrier frequencies in each successive time slot by a predetermined number of carrier frequencies, the last carrier frequency of the plurality of sequentially related carrier frequencies being followed by the first carrier frequency in each successive time slot; and assigning the plurality of sequentially related carrier frequencies so that no adjacent radio fixed part in the array is assigned the same carrier frequency.

9. The method of claim 8, further comprising the step of dividing each of the frames into a first time slot set and a second time slot set.

10. The method of claim 9, further comprising the step of disallowing radio reception in a first set of indexed radio fixed parts during the first time slot set.

11. The method of claim 9, further comprising the step of disallowing radio transmission in a second set of indexed radio fixed parts during the first time slot set.

12. The method of claim 9, further comprising the step of disallowing radio transmission in a first set of indexed radio fixed parts during the second time slot set.

13. The method of claim 9, further comprising the step of disallowing radio reception in a first set of indexed radio fixed parts during the second time slot set.

14. A wireless local loop communication system, comprising:

a plurality of indexed radio fixed parts;

a plurality of sequentially related carrier frequencies, said sequentially related carrier frequencies being divided into a series of frames having a plurality of time slots;

a control unit connected with the plurality of indexed radio fixed parts for assigning each of the sequentially related carrier frequencies to a respective one of the plurality of indexed radio fixed parts in sequential order in each of the time slots; and wherein the control unit indexes each of the sequentially related carrier frequencies during each successive time slot by advancing the plurality of sequentially related carrier frequencies a predetermined number of carrier frequencies at each of the indexed radio fixed parts, the last carrier frequency of the series of sequentially related carrier frequencies being followed by the first carrier frequency.

15. The wireless local loop communication system of claim 14, wherein the sequentially related carrier frequencies are assigned so that no adjacent indexed radio fixed part is assigned the same carrier frequency when the number of indexed radio fixed parts exceeds the number of sequentially related carrier frequencies.

16. The wireless local loop communication system of claim 14, wherein said frames are divided into a first time-slot set and a second time-slot set.

17. The wireless local loop communication system of claim 16, wherein the control unit disallows radio reception in a first set of indexed radio fixed parts during the first time-slot set.

18. The wireless local loop communication system of claim 16, wherein the control unit disallows radio transmission in a second set of indexed radio fixed parts during the first time-slot set.

19. The wireless local loop communication system of claim 16, wherein the control unit disallows radio transmission in a first set of indexed radio fixed parts during the second time-slot set.

20. The wireless local loop communication system of claim 16, wherein the control unit disallows radio reception in a second set of indexed radio fixed parts during the second time-slot set.

* * * * *